G. A. KINDER.
SEWING MACHINE.
APPLICATION FILED MAY 31, 1917.

1,259,996.

Patented Mar. 19, 1918.
9 SHEETS—SHEET 1.

Inventor
Garrett A. Kinder
By John C. Dewey
Attorney.

G. A. KINDER.
SEWING MACHINE.
APPLICATION FILED MAY 31, 1917.

1,259,996.

Patented Mar. 19, 1918.
9 SHEETS—SHEET 2.

Inventor
Garrett A. Kinder
By John E. Dewey
Attorney

G. A. KINDER.
SEWING MACHINE.
APPLICATION FILED MAY 31, 1917.
1,259,996.
Patented Mar. 19, 1918.
9 SHEETS—SHEET 3.
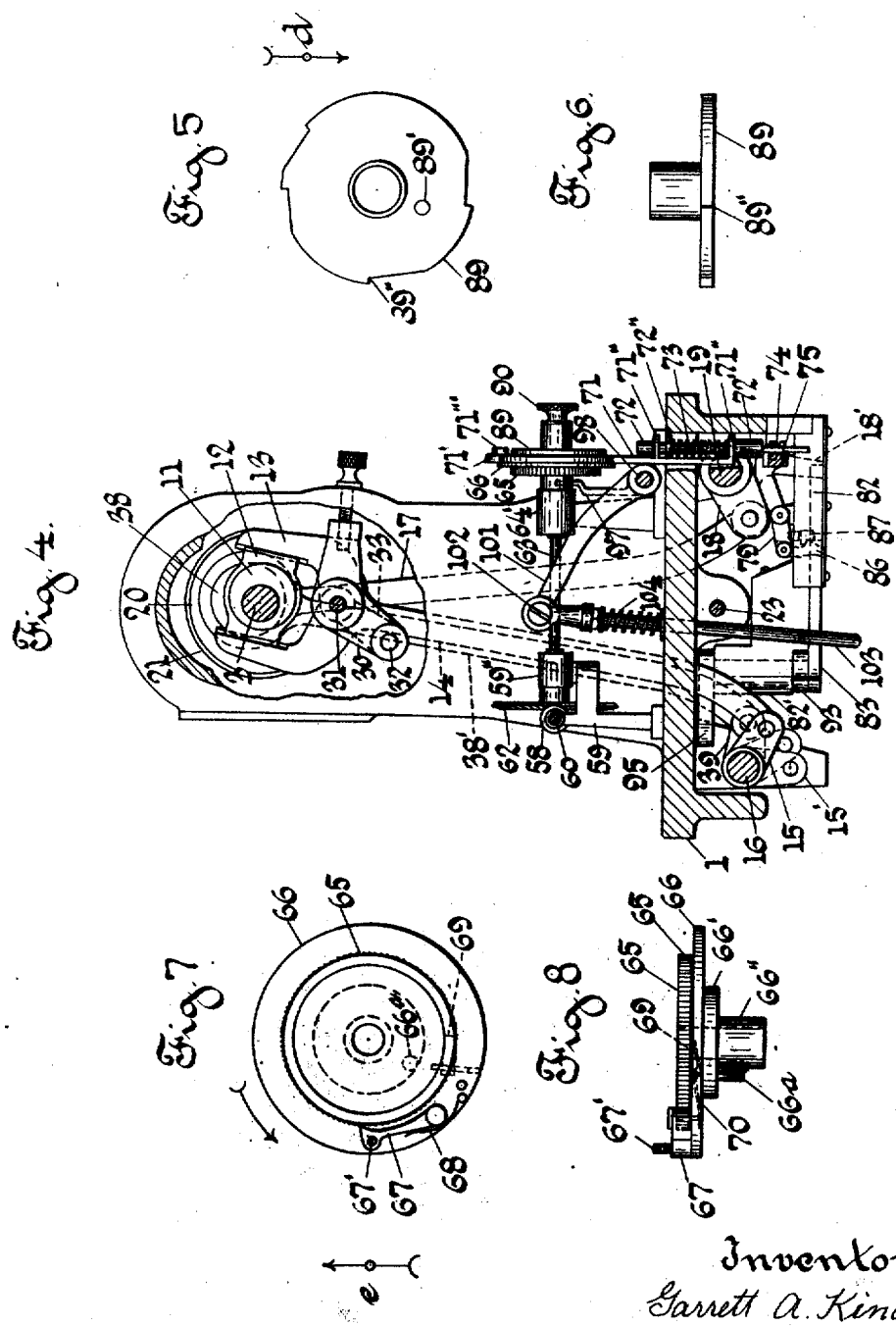
Inventor
Garrett A. Kinder
By John C. Dewey
Attorney.

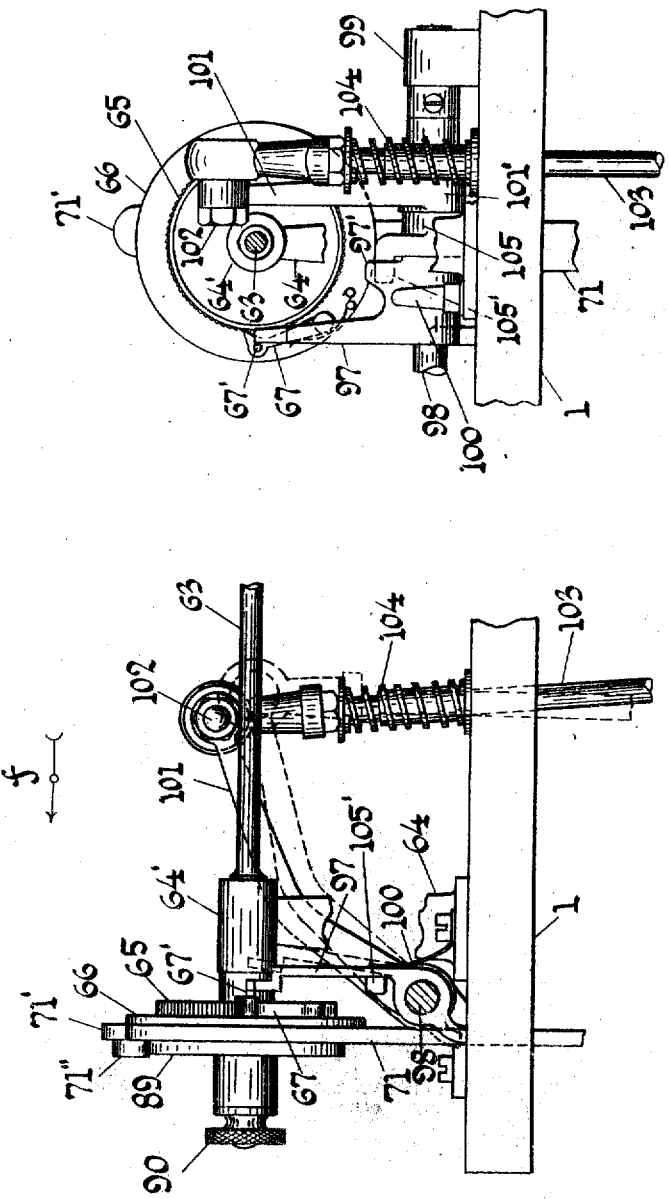

G. A. KINDER.
SEWING MACHINE.
APPLICATION FILED MAY 31, 1917.
1,259,996.
Patented Mar. 19, 1918.
9 SHEETS—SHEET 5.
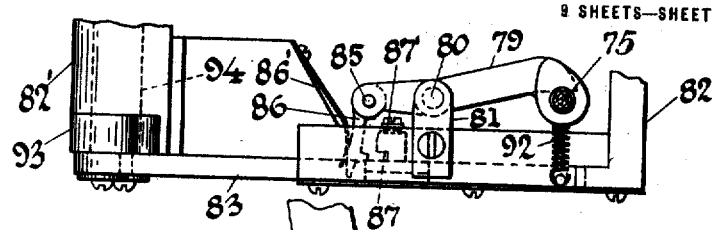
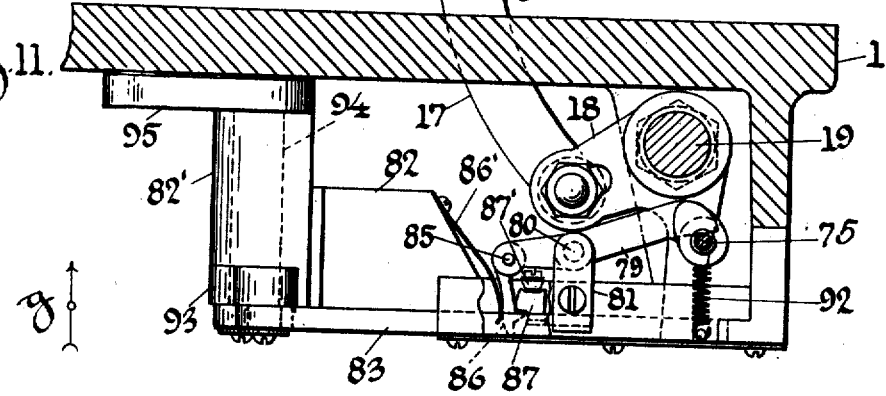
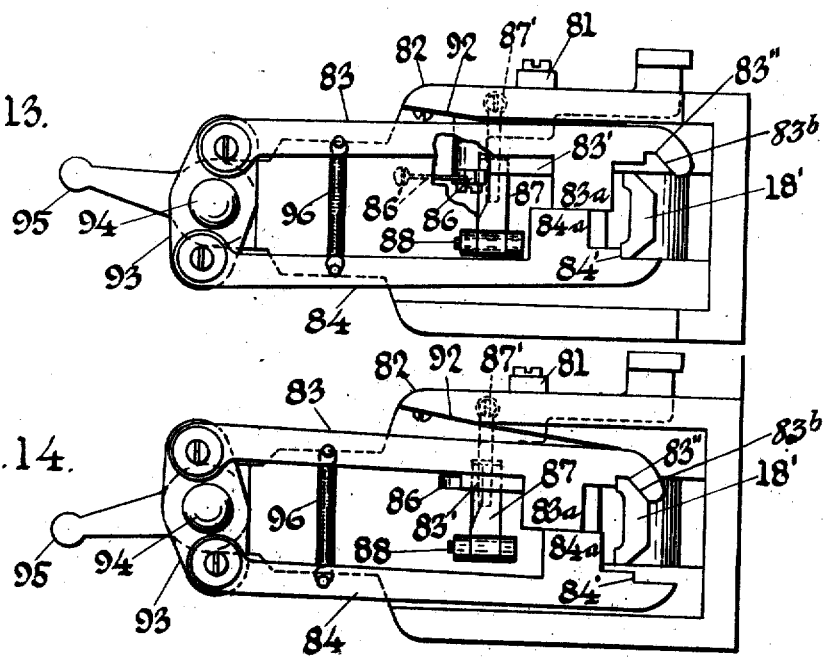
Inventor
Garrett A. Kinder
By John E. Dewey
Attorney.

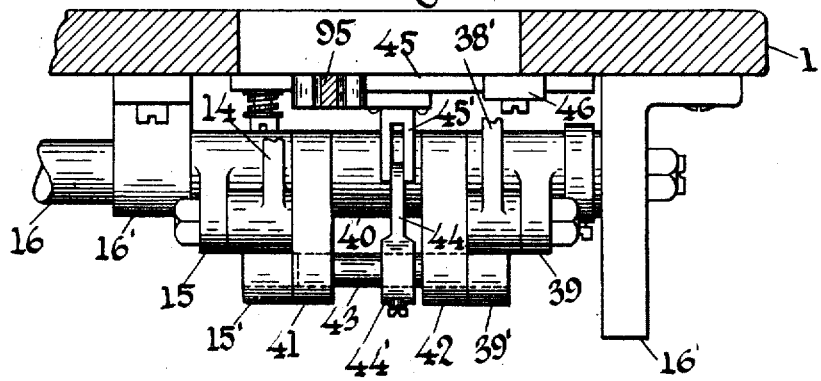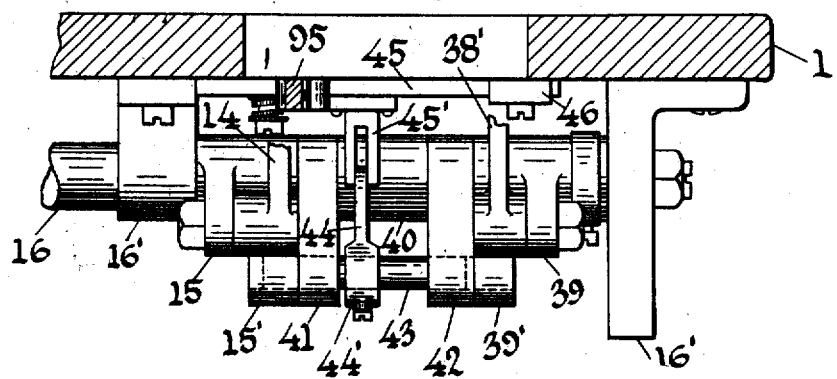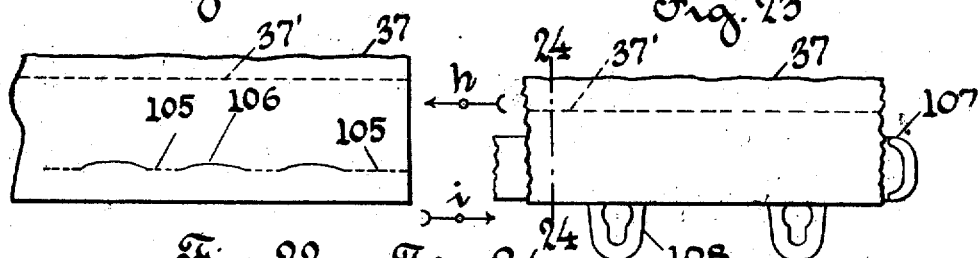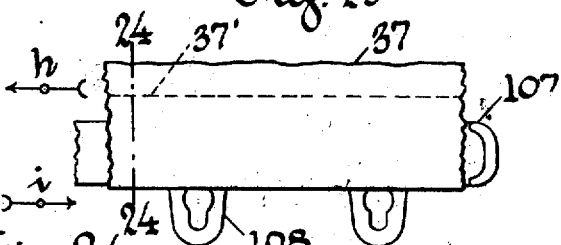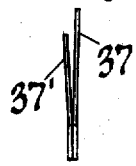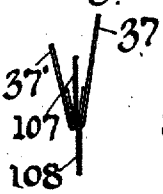

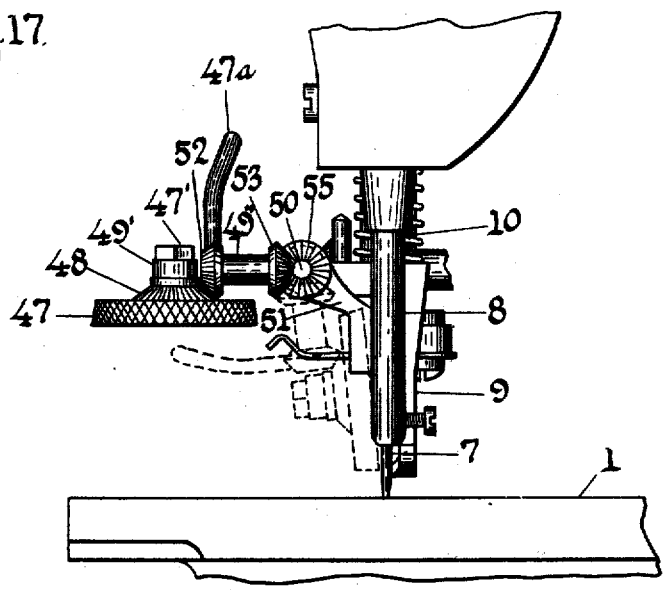
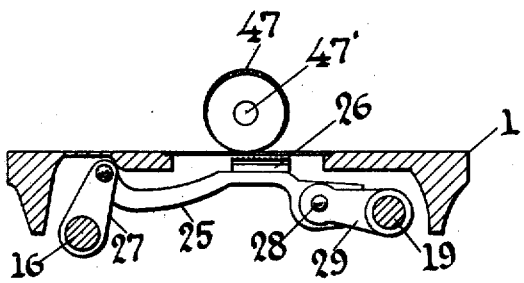
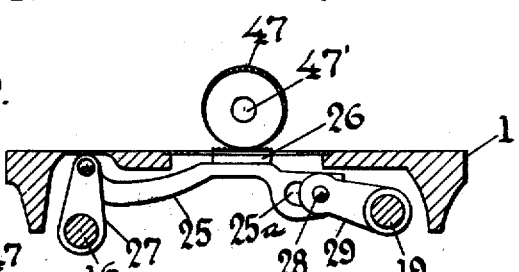
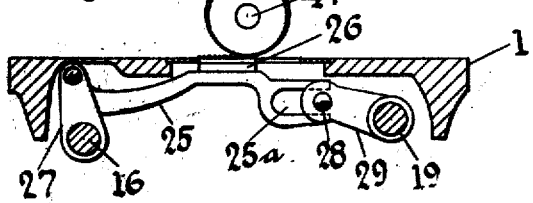

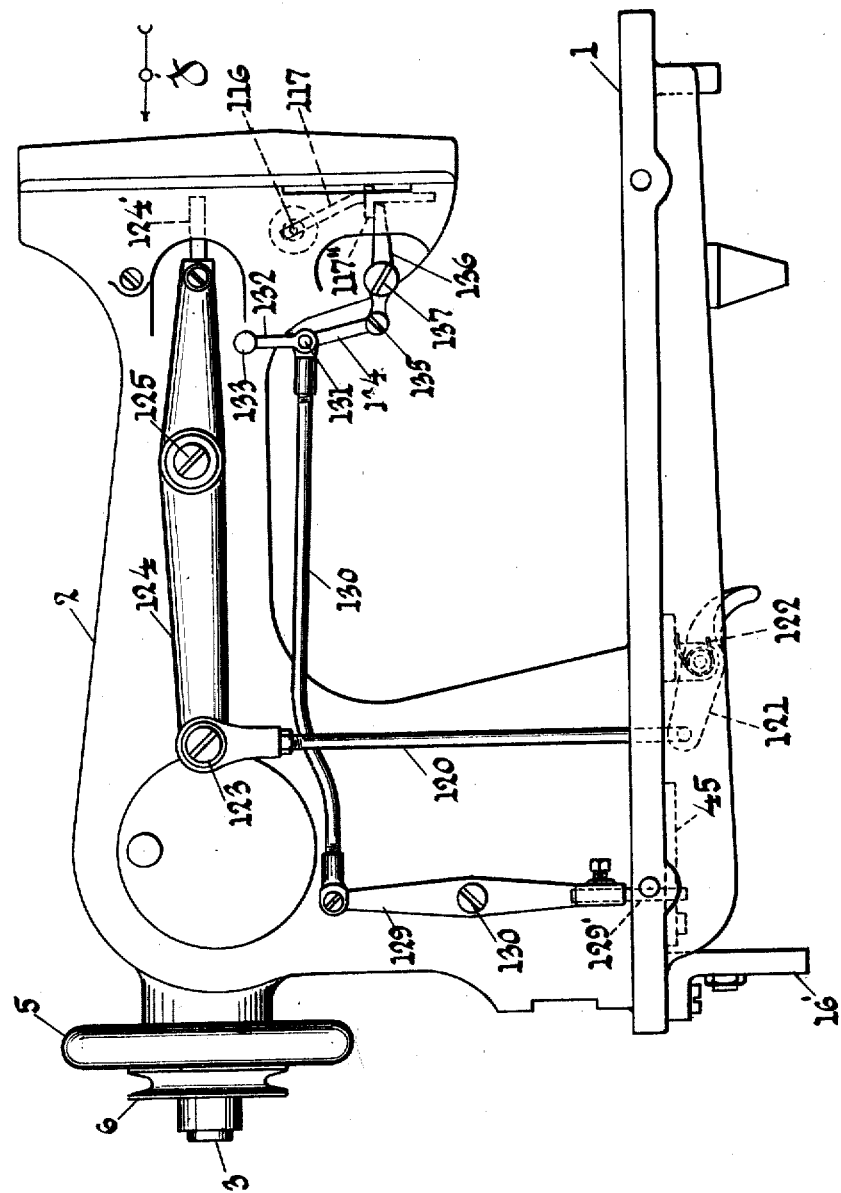

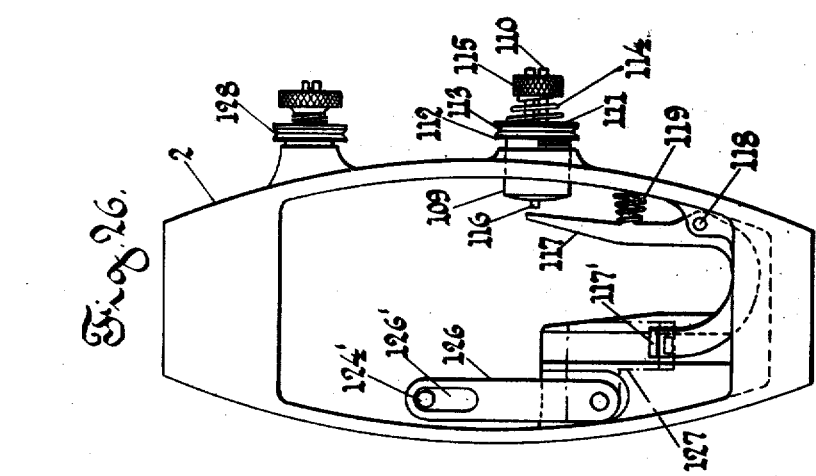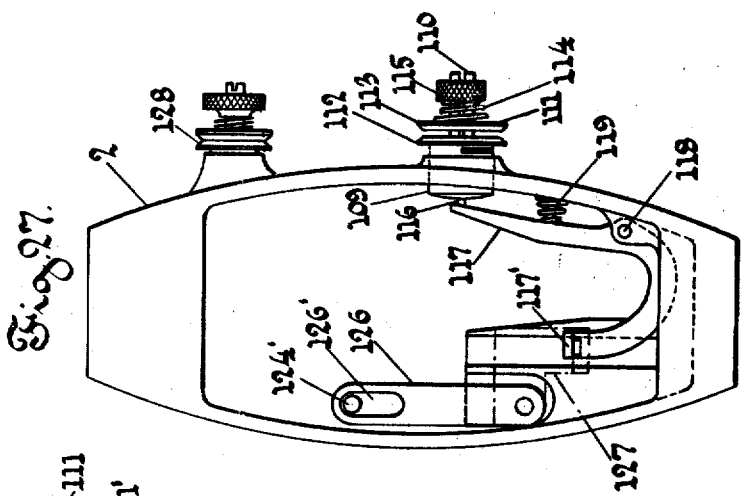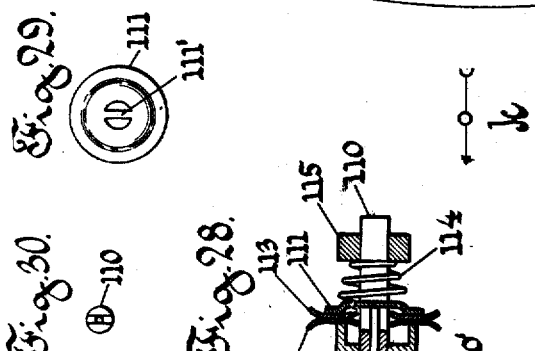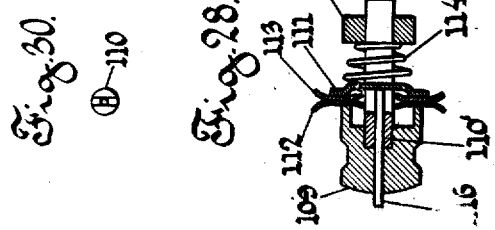

UNITED STATES PATENT OFFICE.

GARRETT A. KINDER, OF WORCESTER, MASSACHUSETTS, ASSIGNOR TO ROYAL WORCESTER CORSET COMPANY, OF WORCESTER, MASSACHUSETTS, A CORPORATION OF MASSACHUSETTS.

SEWING-MACHINE.

1,259,996.     Specification of Letters Patent.     Patented Mar. 19, 1918.

Application filed May 31, 1917. Serial No. 171,960.

*To all whom it may concern:*

Be it known that I, GARRETT A. KINDER, a citizen of the United States, residing at Worcester, in the county of Worcester and State of Massachusetts, have invented certain new and useful Improvements in Sewing-Machines, of which the following is a specification.

My invention relates to sewing machines, and particularly to that class of sewing machines used in stitching together two or more thicknesses of cloth, or other material, as in the manufacture of corsets, and my invention more particularly relates to a supplemental mechanism, to be applied to and combined with a sewing machine of the class referred to.

In the manufacture of corsets as ordinarily practised, in stitching the length of the stripping so termed, to the edge of the front section of the corset which is to have the steel, having the fastening clasps thereon, secured thereto, it is customary to have the stripping marked at regular intervals, to indicate where there is to be stitching, and where there is to be no stitching. In the places where there is no stitching, openings are left for the passage of the clasps on the steel. The operator, in stitching the two fabrics together, in order to leave the openings above referred to, at the points indicated, is obliged, after operating the machine for the desired length of the stitching, to manually throw the needle out of action, and to draw the fabric along to the point indicated, to leave an opening between the two fabrics, and then throw the needle into action, to make the desired length of stitching, and then throw the needle out of action, at the indicated point, for the next opening between the two fabrics, and draw the fabric along to the point indicated, to leave the opening between the two fabrics, and this operation has to be continuously repeated in order to stitch the two fabrics together in such a way as to leave openings between the fabrics, at predetermined distances apart, for the passage of the clasps on the steel in the front section of the corset, as above stated.

The object of my invention is to provide a supplemental mechanism, particularly adapted to be applied to and combined with a sewing machine of ordinary construction, used in stitching the stripping to the edge of the front section of a corset, which mechanism will automatically measure the length of the two fabrics to be stitched together, and the length of the two fabrics where the stitching is to be omitted, and automatically feed the work quickly forward at predetermined intervals in the operation of sewing the stripping to the edge of the front section of the corset, so as to make a long or floating stitch between sections or lengths of normal stitching, and thus leave openings between the two fabrics for the passage of the clasps on the steel.

By means of my supplemental mechanism, the operation of the sewing machine, in performing the work desired, is entirely automatic.

My invention consists in certain novel features of construction of my supplemental mechanism, to be applied to and combined with a sewing machine of ordinary construction, for the purpose above stated, as will be hereinafter fully described.

I have shown in the drawings parts of a sewing machine of ordinary construction, with my improvements applied thereto, and combined therewith, sufficient to enable those skilled in the art to understand the construction and operation thereof.

Referring to the drawings:—

Fig. 4 is a section, on line 4, 4, Fig. 1, looking in the direction of arrow *c*, same figure.

Fig. 5 is a top view of the trip cam detached.

Fig. 6 is an edge view of the trip cam, shown in Fig. 5, looking in the direction of arrow *d*, same figure.

Fig. 7 is a top view of the trip cam feed mechanism, detached.

Fig. 8 is an edge view of the parts shown in Fig. 7, looking in the direction of arrow *e*, same figure.

Fig. 9 is a side view, on an enlarged scale, of the trip cam feeding mechanism.

Fig. 10 is an end view of the parts shown in Fig. 9, looking in the direction of arrow *f*, same figure.

Fig. 11 is, on an enlarged scale, an end elevation of the rock shaft selecting mechanism.

Fig. 12 shows the parts shown in the lower part of Fig. 11, in a different position.

Fig. 13 is a bottom view of the parts shown in Fig. 11, looking in the direction of arrow *g*, same figure.

Fig. 14 corresponds to Fig. 13, but shows some of the parts in a different position.

Fig. 15 is, on an enlarged scale, a detail of the rock shaft and engaging pin.

Fig. 16 corresponds to Fig. 15, but shows some of the parts in a different position.

Fig. 17 is a detail view of the feed contact roll, and a portion of the sewing head end of the machine.

Fig. 18 is a detail of the feed shafts, and connections, and the contact roll.

Fig. 19 corresponds to Fig. 18, but shows some of the parts in a different position.

Fig. 20 corresponds to Fig. 19, but shows some of the parts in a different position.

Fig. 21 shows a plan view of a detached section of two fabrics stitched together in such a way as to leave openings, at predetermined distances, between the two fabrics.

Fig. 22 is an end view of the parts shown in Fig. 21, looking in the direction of arrow *h*, same figure.

Fig. 23 shows the two fabrics shown in Figs. 21 and 22, turned over, after the steel with the clasps thereon has been placed between the fabrics, and the clasps passed through the openings therein.

Fig. 24 is a section, on line 24, 24, Fig. 23, looking in the direction of arrow *i*, same figure.

Figure 1:
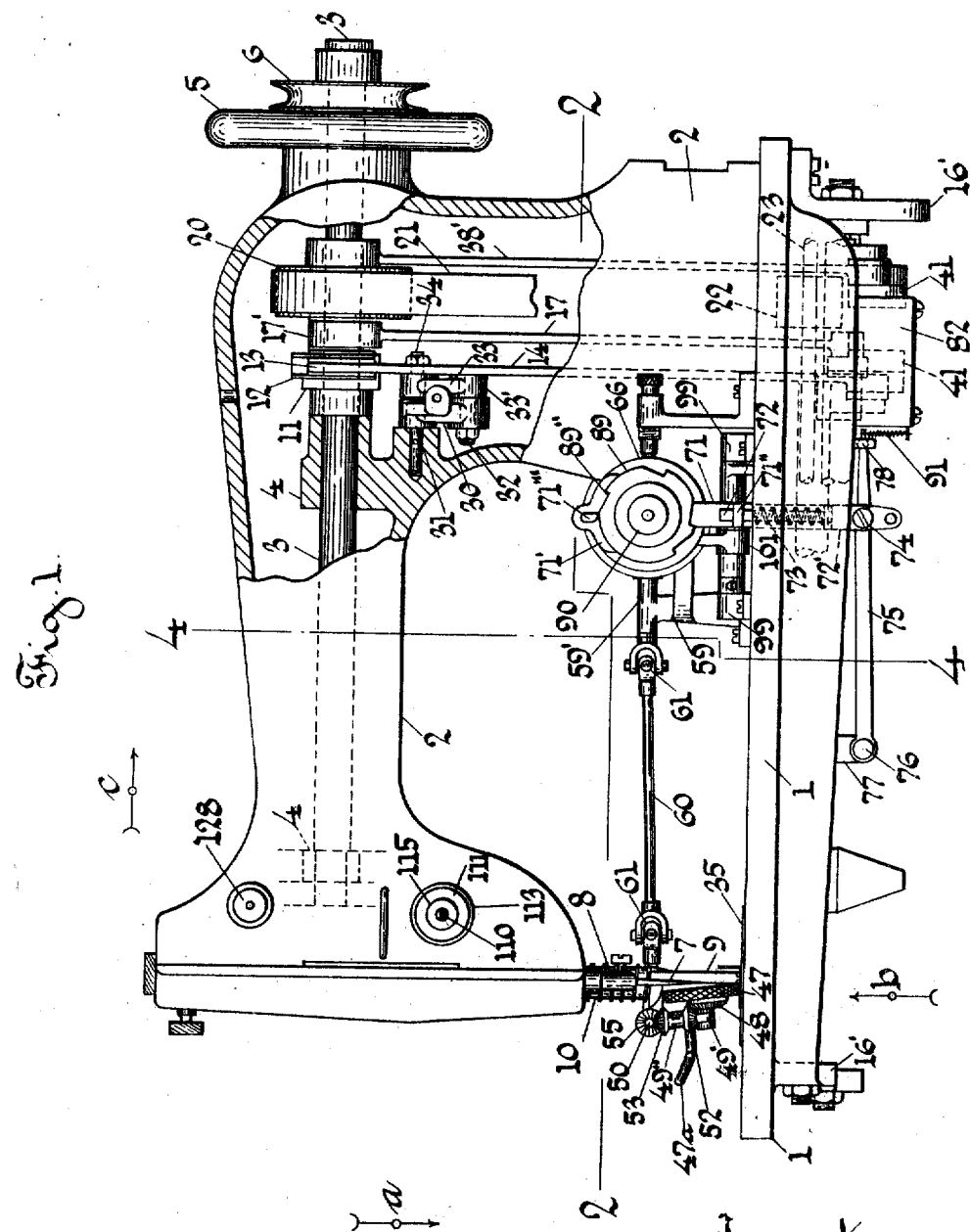
Figure 1 is a side view of a sewing machine with my improvements applied thereto; a portion of the sewing machine body is broken away.

Fig. 25 is the rear view of the machine shown in Fig. 1; the stitching mechanism and some other parts shown in Fig. 1 are omitted in this figure.

Fig. 26 is an end view, on an enlarged scale, of the parts shown at the right in Fig. 25, looking in the direction of arrow *j*, same figure.

Fig. 27 corresponds to Fig. 26, but shows some of the parts in a different position.

Fig. 28 shows, on an enlarged scale, a sectional view of one of the tension devices shown in Figs. 26 and 27.

Fig. 29 is a plan view of one of the tension device washers, shown in Fig. 28.

Fig. 30 is an end view of the tension device pin shown in Fig. 28 detached, looking in a direction opposite to the direction of arrow *k*, same figure.

In the accompanying drawings, 1 is the machine bed, having the usual hollow arm 2 formed integral therewith. 3 is the main drive shaft, mounted in suitable bearings 4 within the upper part of the arm 2. The shaft 3 has secured thereon a hand wheel 5, and driving pulley 6, and through the shaft 3, the needle 7, and needle bar 8, are operated in the usual and well known way.

9 is the presser foot, secured to a presser bar 10, and operated in the usual manner. Secured on the shaft 3 is a double eccentric 11, Fig. 4, which has loosely mounted thereon a sleeve 12, which engages the upper forked portion 13 of a connecting rod 14, the lower end of which is jointed to an arm 15 of a bell crank on the rock shaft 16; said rock shaft 16 being journaled in bearings 16', Fig. 3, underneath the machine bed 1.

17, Fig. 4, is a connecting rod, having at its upper end a strap, encircling the eccentric 11, see Fig. 1. The lower end of the rod 17 is jointed to an arm 18, secured on the shaft 19, see Fig. 4; said shaft 19 being mounted in suitable bearings underneath the bed 1, Fig. 3. The arm 18 is provided with a downwardly extending or depending part or member 18' forming, with said arm 18, a bell-crank lever. (See Figs. 4 and 11.) 20 is a pulley, secured on the driving shaft 3, Fig. 1, and connected by means of a belt 21 to a pulley 22, secured on a shaft 23, Fig. 3; said shaft 23 is mounted in suitable bearings underneath the bed 1, and carries at its front end the revolving hook or loop-taker 24, see Fig. 3.

Figure 3:
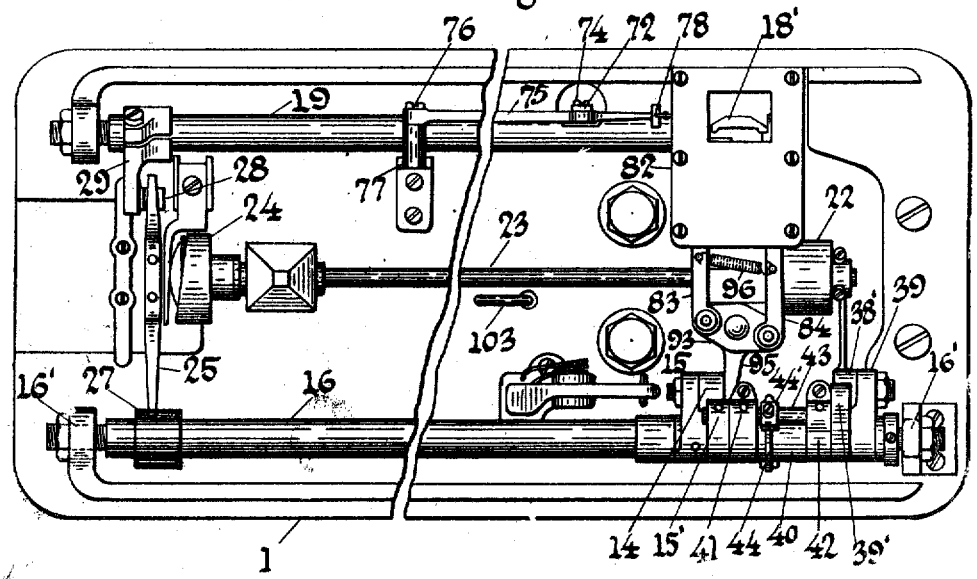
Fig. 3 is a view of the parts on the underside of the machine bed, looking in the direction of arrow *b*, Fig. 1.

25, Figs 3 and 18, is a feed bar, having the feed dog 26 secured thereto; said bar 25 is jointed at one end to an arm 27 secured to the rock shaft 16; the opposite end of the feed bar 25 is slotted at 25ª, and is engaged by a stud 28 secured on an arm 29, which is secured on the shaft 19, see Figs. 18, 19, and 20.

30, Fig. 4, is a bell crank lever, pivoted at 31 to the machine body, one arm of said lever 30 being jointed at 32 to one end of a link 33; said link 33 has its opposite end jointed at 34, Fig. 1, to the connecting rod 14. By varying the position of the bell crank lever 30, the feed of the work, and consequently the length of stitch is adjusted in the usual and well known way.

35, Fig. 1, is a guide plate through which the fabric 37, Fig. 21, to be stitched, is directed to the needle in the usual manner.

The parts above described may be of any usual and well known construction.

I will now describe my improvements applied to and combined with the parts above described.

An eccentric 38, Fig. 4, is secured on the drive shaft 3; the eccentric 38 is encircled by a strap at the upper end of a connecting rod 38'. The lower end of the rod 38' is pivotally connected to a bell crank lever 39, which is loosely mounted on the rock shaft 16, Figs. 15, and 16.

40 is a hub secured on the rock shaft 16, see Figs. 15 and 16, and has downwardly extending arms 41 and 42. 43 is a pin, slidably mounted in the arms 41 and 42; the pin 43 has secured thereon the hub 44' of an arm 44.

45, Figs. 15, and 16, is a slide, loosely mounted in a bearing 46; said bearing 46 is secured to the machine bed 1. The slide 45 has two downwardly extending fingers 45', forming a fork which engages the arm 44.

By means of the slide 45, which is operated by mechanism to be hereinafter described, and arm 44, the pin 43 may be moved horizontally, to engage a coinciding opening in each of the downwardly extending arms 15', or 39', of the bell crank levers 15, and 39.

When the arm 15' on the bell crank lever 15 is engaged by the pin 43, the connecting rod, or feed connection 14, operated from the drive shaft 3, will cause the shaft 16 to rock, and thus cause the feed bar 25 and dog 26 to move the fabric the required length for the ordinary stitches.

When the pin 43 is engaged with the opening in the arm 39', the connecting rod 38' which is operated by an eccentric with greater eccentricity than the eccentric which operates the connecting rod 14, will cause the shaft 16 to be rocked a greater distance, which, as will be readily seen, will cause the feed bar 25 and the dog 26 to move the fabric a greater distance between the ordinary stitches, to form a long stitch which I term a floating stitch, as shown at 106, in Fig. 21.

Figure 2:
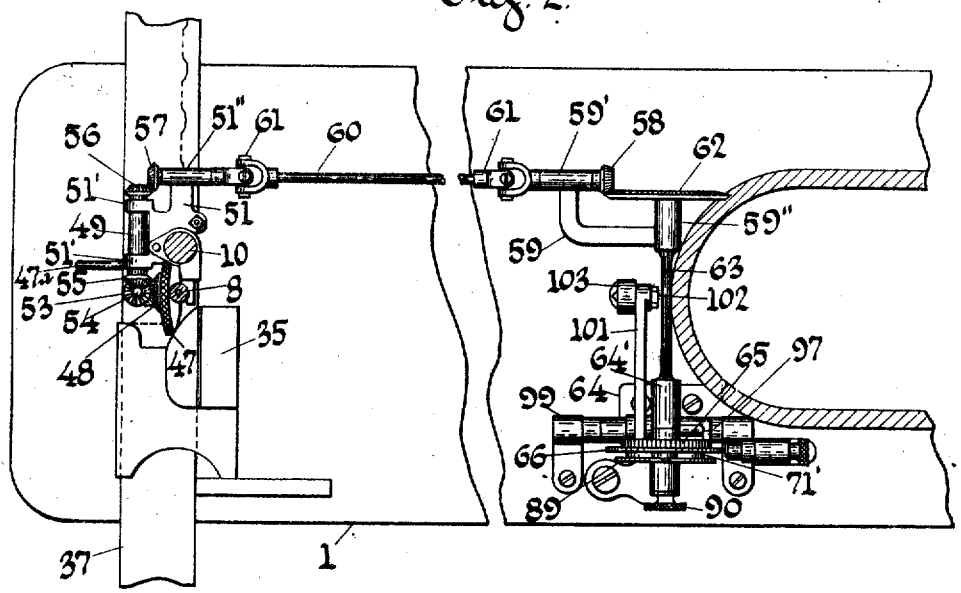
Fig. 2 is a sectional view, taken on line 2, 2, Fig. 1, looking in the direction of arrow *a*, same figure; some parts are omitted, and some parts are broken away in this figure.

I have also provided a roller presser or feed contact roll 47, Fig. 1; the roll 47 has secured thereon a bevel gear 48; the roll 47 is journaled on a stud 47', Fig. 17, fixed to a horizontally extending arm 49' of a swinging stand 49, Fig. 2, which is loosely mounted on a shaft 50, Fig. 17; the shaft 50 is loosely mounted in bearings 51' on a stand 51, Fig. 2, secured to the presser bar 10.

52, and 53, Fig. 17, are bevel gears secured on a shaft 54, Fig. 2; the shaft 54 is loosely mounted in a bearing 49" on the stand 49, Fig. 1. The bevel gear 52 meshes with and is driven by the bevel gear 48, which is secured to the roll 47. The gear 53 meshes with and drives the bevel gear 55, secured on one end of the shaft 50. On the opposite end of the shaft 50 is secured a bevel gear 56, Fig. 2, which meshes with a gear 57, secured on one end of a shaft which is loosely mounted in a bearing 51" on the stand 51.

58, Fig. 2, is a bevel gear secured on one end of a shaft loosely mounted in a bearing 59' on the stand 59, which is secured to the bed 1. The shafts, carrying the bevel gears 57, and 58, are connected by means of an intermediate shaft 60, and universal joints 61.

The feed roll 47 may be swung outwardly and upwardly from its normal position, when the presser foot shank is raised to its upper position, by means of an extension 47ª, see Fig. 17, in which figure the roll 47 and connecting parts are indicated by broken lines in their normal position, and by full lines in their inoperative position, which allows freedom in threading the needle by the operator.

62, Fig. 2, is a bevel gear secured on one end of a shaft 63; the shaft 63 is loosely mounted in a bearing 59" on an arm forming part of the stand 59, and in a bearing 64' on the stand 64. The shaft 63 has also secured thereon a ratchet or serrated wheel 65, having its periphery serrated in one direction, and one face of said wheel serrated in the opposite direction, see Fig. 8.

66, Figs. 2, 9, and 10, is a pawl disk which is loosely mounted on the shaft 63; the disk 66 has pivoted thereto the feed pawl 67, Figs. 7, and 8, which engages the serrations on the periphery of the wheel 65, causing said disk 66 to be revolved with said wheel 65, in the direction of the arrow, Fig. 7. The pawl 67 is retained in contact with the wheel 65 by means of a spring 68.

69, Fig. 8, is a pawl pivoted to the disk 66, and retained in contact with the serrated face 65' of the wheel 65, by means of a spring 70. The pawl 69 prevents the pawl disk 66 from revolving backward.

The disk 66 has a projecting hub 66', Fig. 8, which extends into an elongated opening in the upper portion 71', of a connecting link 71, Fig. 4; the link 71 has a yielding lower portion 72; said portion 72 is slidably mounted in projecting lugs 71" on the link 71. The portion 72 has an enlarged shoulder 72', which engages the lower projecting lug 71"; the portion 72 has also secured thereon a collar 72", which acts as a bearing for one end of a compression spring 73, which encircles said portion 72; the opposite end of the spring 73 has its bearing against the lower projecting lug 71". The spring 73 acts to retain the portion 72 in its upper normal position in relation to the link 71, see Fig. 4. The yielding portion 72 is pivotally connected at 74 to a lever 75; the lever 75 has one end pivoted at 76 to a hanger 77, secured to the bed 1, see Fig. 1.

The opposite end of the lever 75 is pivotally connected, at 78, to one end of a latch-operating lever 79, Fig. 11; the lever 79 is pivoted at 80 to a stand 81, secured to the frame 82, containing the feed selecting levers 83, and 84, Figs. 13, and 14. Pivoted at 85, Fig. 11, to the lever 79, is a downwardly extending lifting latch 86, which engages a latch 87, Fig. 13, which is pivotally attached at 88, to the frame 82. The latch 87 engages the lever 83, and retains said lever 83 in its normal position, as seen in Fig. 13; the latch 87 is retained in its lowered or operative position by a spring 87', Figs. 11, 13 and 14.

Mounted upon the hub 66'' of the disk 66 is a pattern or trip cam 89, Fig. 1; the cam 89 is retained in position, in relation to the disk 66, by means of a pin 66ª, Fig. 8, secured in the projecting hub 66'; the pin 66ª engages an opening 89', Fig. 5, in the trip cam 89. The cam 89 and disk 66, are retained in position on the shaft 63, between the wheel 65, and the outer end of said shaft 63, by means of a nut 90, Fig. 9, secured on the outer end of said shaft 63.

A projecting lug 71''', Fig. 1, on the upper portion 71' of the link 71, is engaged by the trip cam 89, as the cam is revolved, by the mechanism above described. The lug 71''' is retained in contact with the periphery of the trip cam 89, by means of a spring 91, Fig. 1, which has one end secured to the frame 1, and the opposite end secured to one end of the lever 75. The spring 91 acts to move the link 71 and lever 75 downwardly, and the projecting lug 71''' drops into the notched recesses 89'' in the periphery of the trip cam 89.

As the outer end of the lever 75 is carried downwardly, the latch lever 79, Fig. 11, will be operated by said lever 75, and cause the inner end of said lever 79 to raise the latch 86 upwardly; the latch 86 is held in engagement with the latch 87, by a spring 86', Fig. 11, and carries upwardly with it the hold latch 87, Fig. 13, which in turn will release the indicating lever 83, and permit said lever 83 to be moved laterally by the spring 92 and into the path of movement of a downwardly extending member 18' on an arm 18 secured to the feed-lifting rock-shaft 19.

The feed selecting levers 83, and 84, are pivotally connected to opposite ends of a lever 93, Figs. 13 and 14; the lever 93 is secured on the lower end of a shaft 94, mounted in a bearing 82' on the frame 82, Fig. 11. The shaft 94 has secured to its upper end a slide operating arm 95, which engages and operates the slide 45, Figs. 15, and 16.

When the hold latch 87 has been lifted by the latch 86, so as to be disengaged from the lever 83, the said lever 83 will be moved laterally by the spring 92 so as to be in the path of movement of the depending member 18', and as the shaft 19 (Fig. 4) is operated, through the connecting rod 17, the said member 18' on the arm 18, will engage a shoulder at the inner side of the notch 83'' in the lever 83 (Fig. 14) and will thus move the said lever 83 longitudinally. This will cause a partial rotation of the shaft 94, and, through intermediate connections, comprising arm 95, slide 45, and yoke arm 44, will impart a horizontal movement to the pin 43 (Fig. 15), causing said pin to be disengaged from the bell-crank arm 15' and to be engaged with the bell-crank arm 39', and thus form a connection between the feed rock shaft 16 and the connecting rod 38'. As the connecting rod 38' is operated from the large-throw eccentric 38, a long throw will now be imparted to the feed dog 26 to form a long or floating stitch.

The levers 83 and 84 are yieldingly connected by means of a spring 96 and are retained in spaced relation to each other by means of the projections 83ª and 84ª on said levers. When the lever 83 is moved longitudinally by the member 18', as above described, the projection 83' on said lever (Fig. 13) will have engaged the latch 86 and released it from the hold latch 87 (see Fig. 12) so that the latch 87 will now be free to engage said lever 83 when the latter next assumes the lateral position shown in Fig. 13. When the vibrating member 18' performs its next backward stroke in engagement with the inclined shoulder 83ᵇ at the outer side of the notch 83'', the lever 83 will be moved laterally in opposition to the stress of the spring 92, and the connecting spring 96 will cause the lever 84 to follow the lateral movement of the lever 83, thus moving these levers from the lateral positions shown in Fig. 14 to the lateral positions shown in Fig. 13. When the lever 83 is thus moved laterally the hold latch 87 will be forced down by its spring 87' and said hold latch will now be in a position to retain the said lever 83 in the lateral position shown in Fig. 13 until said hold latch is again lifted by the latch 86. When the lever 84 is in the lateral position shown in Fig. 13 the shoulder 84' thereon will be brought into the path of movement of the depending vibrating member 18', so that at the next inward movement of said member the said lever 84 will be moved inward longitudinally, causing a reverse longitudinal movement of the lever 83. It will thus be understood that these longitudinal movements of the levers 82 and 84 will cause, through the connections described, the pin 43 to be engaged alternately with the arms 15' and 39' of the bell-crank levers 15 and 39. When ordinary stitching is to be performed the said pin 43 will be engaged with the bell crank arm 15' of the lever 15 operated from the usual feed-actuating eccentric 11, but when a long or floating stitch is to be made said pin 43 will be engaged with the arm 39' of the bell-crank lever 39, as will be understood from the foregoing.

The positions of the pin 43 will be determined by the pattern cam 89 operated from the roller-presser or feed roll 47, through the connections above described, and which feed roll is rotated by the forward movement of the work fed by the feed dog 26.

The pattern cam 89 will be of a proper construction to perform any desired character of stitching. With the form of cam shown in Figs. 1 and 5, and which has four notches between four full peripheral portions of different lengths, four long or floating stitches will be made between sections of plain or ordinary stitching governed by the full peripheral portions of said cam during one complete rotation of said cam When the said cam 89 has completed a revolution, and a desired stitching operation has been completed, the rotation of said cam will be arrested by the engagement of the pin 67' with an upright lever 97, the hub of which is pivoted on a rod mounted on the bed plate 1. The engagement of the pin 67' with the lever 97 disengages the pawl 67 from the serrated wheel 65 and thus disconnects the pawl disk 66, and the cam wheel 89, rotating with said pawl disk from the said wheel rotating with the shaft 63. (See Figs. 8 and 9).

The lever 97 is held in its inner position, shown in full lines in Fig. 9, and thus in the path of movement of the pin 67', by means of a spring 100. On the rod 98 is loosely mounted the hub 101' of a lever 101; to which may be jointed, at 102, the upper end of a rod 103, which may be operated by a knee-lever or foot pedal. The lever 101 is provided with a laterally projecting part 105' engaging a part 97' of the lever 97, so that by moving said lever 101 to the position shown in dotted lines in Fig. 9 the lever 97 will be disengaged from the pin 67' on the pawl 67.

The lever 101 is retained in its normal position, shown by full lines in Fig. 9, by a spring 104, which encircles the rod 103.

As the rod 103 is moved downwardly, the lever 97 is disengaged from the pawl stud 67', as shown by broken lines in Fig. 9, allowing the pawl 67' to engage the serrated surface of the wheel 65.

In Fig. 21 is shown a detached section of fabric 37, forming a part of one front section of a corset. 37' is the strip of fabric, which is sewed to the corset fabric 37, near one edge thereof. At regular predetermined intervals, and for a predetermined distance, the stitching 105 is omitted, and the two fabrics are not sewed together, but an opening is left between the same, and the thread is floated or carried from one stitching 105 to the next stitching 105, as shown at 106, Fig. 21.

The steel 107, having the clasps 108 thereon, is combined with the fabric 37, and the strip 37', by turning over the free edges of the same and placing the steel 107 between the two thicknesses of material, and passing the clasps 108 through the openings between the fabrics, between the stitching 105, see Fig. 24.

I will now describe the thread tension mechanism shown in Figs. 25, 26, and 27, and which is combined with and automatically operated by the slide 45 hereinbefore described, when the fabric is moved a greater distance between the ordinary stitches, to form the floating stitch.

The thread tension mechanism referred to, comprises the cylindrical portion or member 109, Figs. 26, 27, and 28, which is secured in the frame 2. The member 109 has secured therein the threaded end 110' of a stud 110, which is slotted longitudinally, from its outer end to its threaded inner end 110'. A washer 111 has an opening therethrough for the stud 110, and a bar 111' extends across said opening, and through the longitudinal slot in the stud 110, see Fig. 28. 112 and 113 are washers or disks between which the thread is passed in the usual and well known way. The outer side of the washer 113 bears against the outer end of the member 109. The outer side of the washer 113 is engaged by the washer 111. The three washers 111, 112, and 113 are retained in their closed position by means of a tension spring 114, which extends between the outer washer 111 and a thumb nut 115, threaded on the outer end of the stud 110. The tension of the spring 114 is regulated by turning on or off the nut 115. A pin 116 is loosely mounted in the member 109 and stud 110. The pin 116 extends into the slotted portion of the stud 110, and the inner end of said pin 116 is engaged by the cross bar 111' of the washer 111, see Fig. 28.

117, Figs. 26 and 27, is the tension release operating lever. The lever 117 is pivoted at 118 to the frame 2, and is retained in its inoperative position, Fig. 26, by means of a compression spring 119.

120, Fig. 25, is a rod connected to the usual presser foot operating mechanism. The lower end of the rod 120 is connected to a spring actuated rock arm 121, shown by broken and full lines in Fig. 25, which is pivotally mounted and actuated by a spring 122. The upper end of the rod 120 is pivoted at 123 to one end of a horizontally extending lever 124, which is pivotally mounted at 125 on the frame 2. The other end of the lever 124 has the reduced end or rod 124', which extends loosely through a slot 126' in a downwardly extending member 126. To the lower end of the member 126 is secured a member 127, shown by dotted lines in Figs. 26 and 27, which engages an outwardly extending projection 117' on the lever 117 of the ordinary release mechanism.

I will not briefly describe the operation of the above mentioned parts, which are of the usual and well known construction.

When the thread tension mechanism is to be operated, through the lever 124, the rod 120 will cause the outer end of the lever 124 to be carried downwardly, consequently the other end 124' to be moved upwardly, and through the member 126, the member 127 engages the projection 117' on the lever 117, and causes the lever 117 to be actuated, against the action of the spring 119, and cause the upper end of the lever 117 to engage the pin 116 and force said pin inwardly against the portion 111' of the washer 111, to compress the spring 114, see Fig. 27. This will allow the washers or disks 112 and 113 to separate and allow the thread extending between said washers to move freely and with only a slight tension, corresponding to the tension produced by the second tension device, of ordinary construction and operation, shown at 128, Figs. 1, 26, and 27, which tension 128 is of the usual construction and operation and does not need to be described herein.

I will now describe my auxiliary releasing device for automatically operating the tension device, comprising the parts shown in Fig. 28, and above described, when the fabric is to be moved a greater distance between the ordinary stitches, for the floating stitch.

On the rear of the machine, as shown in Fig. 25, is a vertically extending lever 129, which is pivoted at 130 to the frame 2. The lower end of the lever 129 has a contact end or part 129' which is engaged by the slide 45, shown by broken lines in Fig. 25, and by full lines Figs. 15 and 16, and hereinbefore described in connection with said Figs. 15 and 16. The upper end of the lever 129 is pivotally connected to one end of a connecting rod 130. The opposite end of said rod 130 is pivoted at 131 to the lower end of a link 132; the upper end of said link 132 is pivoted at 133 to the frame 2, see Fig. 25. A second link 134 is pivoted at its upper end to the rod 130. The links 132 and 134 constitute a toggle, as will be understood. The lower end of the link 134 is pivoted at 135 to a horizontally extending link 136, which is pivoted at 137 on the frame 2. The free end of the lever 136 engages an outwardly extending projection 117″, Fig. 25, on the lever 117, above described.

When the slide 45 is caused to move to the right, as hereinbefore described, the lever 129 and the rod 130, through the toggle afforded by the links 132 and 134, and the lever 136, will cause the engaging end of the lever 136 to engage the projection of the lever 117″ on the lever 117, and move said lever 117 upwardly, thus moving said lever 117 against the pin 116 of the tension device to release the tension on the thread, as above described, to allow of a longer stitch between the ordinary stitching, as the fabric is moved forward, and without liability of breaking the thread at this time.

I will now briefly describe the operation of my improvements.

The stripping 37', to be stitched to the corset fabric at one front edge of the corset, is passed through the hollow guide 35, and between the presser foot 9, and feed dog 26, in the usual way.

When the machine is in operation the forward feeding movement of the work will cause a rotation of the roller presser or feed contact roll 47, and, through the connection described, will cause a corresponding continuous rotary movement to be imparted to the wheel 65. So long as the feed pawl 67 on the pawl disk 66 is in engagement with the serrated periphery of said wheel 65 the said pawl disk and the pattern cam 89, connected by the pin 66° with said pawl disk to rotate therewith, will be in continuous rotation. When the lug 71‴ on the link 71 is in engagement with the full peripheral portions of the pattern cam 89 the feed selecting lever 83 will be in the lateral position shown in Fig. 13 and ordinary stitching will be performed; but when, during the rotation of the said cam, one of the notches 89' comes beneath the said lug 71‴ the link 71 will be drawn downward by its spring, causing the lever 79 to be operated to lift the latches 86 and 87, thereby releasing the lever 83 from the said latch 87 and permitting it to be moved laterally by its spring 92, so as to be engaged by the vibrating depending arm 18'. In such positions of the parts the arm 95 will be operated to actuate the slide 45, and cause the pin 43 to be disengaged from the arm 15' of the bell-crank lever 15 and to be engaged with the arm 39' of the bell-crank lever 39, which latter has a long vibrating movement, thereby imparting a long feed movement to the feed dog 26 and causing a long or floating stitch to be made, with a corresponding larger rotary movement of the cam 89 to again bring a full portion of the periphery of said cam beneath the lug 71‴; and while the said lug is in engagement with a full peripheral portion of said cam ordinary stitching will be formed. When a long or floating stitch is to be made the tension on the needle thread is automatically released by the mechanism hereinbefore described.

The pattern cam 89 is provided with as many notches 89' as there are to be openings in the work, afforded by the long or floating stitches, for the passage of the clasps of the stripping at the edge of the front section of the corset, and these notches will be spaced apart by the full peripheral portions of the pattern cam to correspond to the desired lengths of stitching between the openings referred to. When a full rotation of the pattern cam has been performed the pin 67' on the pawl 67 engages the lever 97 and said pawl is thus withdrawn from the serrated periphery of the wheel 65 so that further rotation of said wheel and of the pattern cam connected therewith is arrested. When it is desired to start the stitching for the next operation the attendant depresses the lever 101, either manually or through the rod 103, and the lug 105', movable with the said lever 101, then moves the lever 97 to the position shown in dotted lines in Fig. 9, and the stitching operation for another corset front strip is then repeated.

After the required length of the stripping has been stitched to the front section of the corset, in the manner above described, the stripping is cut off by the attendant. The next operation, which has nothing to do with my present improvements, consists in turning over the corset fabric 27, and stripping 37', and inserting the steel 107, with the clasps 108 thereon, between the two fabrics, with the clasps 108 passing through the openings between the fabrics, left by the stitching being omitted, see Fig. 24. The two fabrics are then stitched together and to the rest of the corset in the ordinary way.

It will be understood that the details of construction of my improvements herein shown and described may be varied if desired.

I have particularly described my improvements to be used on, and in connection with a sewing machine to be used in the manufacture of corsets, but it will be understood that my improvements may be used in connection with sewing machines used in the manufacture of other articles than corsets, if desired.

Having thus described my invention, what I claim as new and desire to secure by Letters Patent is:

1. In a sewing machine, the combination with a stitch-forming mechanism, of a feeding mechanism, comprising means for feeding the work for normal stitching, and for making long or floating stitches between sections of normal stitching, without interrupting the operation of said stitch-forming mechanism, and cam-controlled means, operated from the movement of the work, for making a long or floating stitch when normal stitching of a desired length has been performed.

2. In a sewing machine, the combination with a stitch-forming mechanism, of a feeding mechanism, comprising means for feeding the work for normal stitching, and for making long or floating stitches between sections of normal stitching, without interrupting the operation of said stitch-forming mechanism, cam-controlled means, operated from the movement of the work, for making a long or floating stitch when normal stitching of a desired length has been performed, and automatic means for releasing the tension on the needle thread when a long or floating stitch is to be made.

3. In a sewing machine, the combination with a stitch-forming mechanism, of a feeding mechanism, comprising means for feeding the work for normal stitching, and for imparting long feeding movements to the work, at desired intervals, for the purpose of making long or floating stitches between sections of normal stitching, coupling means between the short normal, and the long or floating stitch feed operating mechanisms, and cam-controlled means, operated from the movement of the work, for throwing the long or floating stitch-feeding mechanism into operation, to make a single long or floating stitch, when normal stitching of a desired length has been performed.

4. In a sewing machine, the combination with a stitch-forming mechanism, of a feeding mechanism, comprising means for feeding the work for normal stitching, and for imparting long feeding movements to the work, at desired intervals, for the purpose of making long or floating stitches between sections of normal stitching, coupling means between the short normal, and the long or floating stitch feed operating mechanisms, cam-controlled means, operated from the movement of the work, for throwing the long or floating stitch-feeding mechanism into operation to make a single long or floating stitch, when normal stitching of a desired length has been performed, and automatic means for releasing the tension on the needle thread when a long or floating stitch is to be made.

5. In a sewing machine, the combination with a stitch-forming mechanism, of a feeding mechanism comprising a feed-operating rock-shaft, two bell-crank levers loosely mounted on said rock-shaft, means for coupling either one of said levers with said rock-shaft when desired, means for imparting movements of different throws to said levers, and cam-controlled means, operated from the movement of the work, for shifting said coupling means so as to perform normal stitching and for making long or floating stitches between sections or lengths of normal stitching.

6. In a sewing machine, the combination with a stitch-forming mechanism, of a feeding mechanism comprising a feed-operating rock-shaft, two bell-crank levers loosely mounted on said rock-shaft, means for coupling either one of said levers with said rock-shaft when desired, means for imparting movements of different throws to said levers, cam-controlled means, operated from the movement of the work, for shifting said coupling means so as to perform normal stitching and for making long or floating stitches between sections or lengths of normal stitching, and automatic means for releasing the tension on the needle thread when a long or floating stitch is to be made.

7. In a sewing machine, the combination with a stitch-forming mechanism, of a feeding mechanism comprising a feed-operating rock-shaft, two bell-crank levers loosely mounted on said rock-shaft, means for coupling either one of said levers with said rock-shaft when desired, means for imparting movements of different throws to said levers, and cam-controlled means, operated from the movement of the work, for shifting said coupling means so as to perform normal stitching and for making long or floating stitches between sections or lengths of normal stitching, said coupling means comprising a member fixed to said rock-shaft, a pin slidably mounted in said member, and a slide for shifting said pin and operatively connected therewith.

8. In a sewing machine, the combination with a stitch-forming mechanism, of a feeding mechanism comprising a feed-operating rock-shaft, two bell-crank levers loosely mounted on said rock-shaft, means for coupling either one of said levers with said rock-shaft when desired, means for imparting movements of different throws to said levers, cam-controlled means, operated from the movement of the work, for shifting said coupling means so as to perform normal stitching and for making long or floating stitches between sections or lengths of normal stitching, said coupling means comprising a member fixed to said rock-shaft, a pin slidably mounted in said member and a slide for shifting said pin and operatively connected therewith, and automatic means for releasing the tension on the needle thread when a long or floating stitch is to be made.

9. In a sewing machine, the combination with a stitch-forming mechanism, of a feeding mechanism comprising means for feeding the work for normal stitching and for making long or floating stitches between sections of normal stitching, without interrupting the operation of said stitch-forming mechanism, a pattern cam, a feed contact roll operated by the movement of the work, connections between said pattern cam and said feed contact roll whereby said cam is rotated from said roll, and means, controlled by said pattern cam, for changing the feeding movements for the different stitching.

10. In a sewing machine, the combination with a stitch-forming mechanism, of a feeding mechanism comprising means for feeding the work for normal stitching and for making long or floating stitches between sections of normal stitching, without interrupting the operation of said stitch-forming mechanism, a pattern cam, a feed contact roll operated by the movement of the work, connections between said pattern cam and said feed contact roll whereby said cam is rotated from said roll, means, controlled by said pattern cam, for changing the feeding movements for the different stitching, and means for releasing the tension on the needle thread when the long or floating stitches are to be made.

GARRETT A. KINDER.

Witnesses:
JOHN C. DEWEY,
MINNA HAAS.